(12) United States Patent
Kaneko et al.

(10) Patent No.: US 9,604,672 B2
(45) Date of Patent: Mar. 28, 2017

(54) VEHICLE BODY REAR STRUCTURE

(71) Applicant: HONDA MOTOR CO., LTD., Tokyo (JP)

(72) Inventors: Kanji Kaneko, Wako (JP); Kazuya Kimura, Wako (JP); Yuki Matsubara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/725,185

(22) Filed: May 29, 2015

(65) Prior Publication Data

US 2016/0090124 A1 Mar. 31, 2016

(30) Foreign Application Priority Data

Sep. 26, 2014 (JP) ................................ 2014-197434

(51) Int. Cl.
  *B62D 21/11* (2006.01)
  *B62D 25/20* (2006.01)

(52) U.S. Cl.
  CPC .......... *B62D 21/11* (2013.01); *B62D 25/2027* (2013.01)

(58) Field of Classification Search
  CPC ..... B62D 21/11; B62D 25/2027; B62D 21/00
  See application file for complete search history.

(56) References Cited

U.S. PATENT DOCUMENTS

| | | | | |
|---|---|---|---|---|
| 4,557,519 A * | 12/1985 | Matsuura | ............. | B62D 25/087 296/187.11 |
| 5,797,647 A * | 8/1998 | Mehrkens | ............. | B62D 21/11 180/311 |
| 5,803,533 A * | 9/1998 | Schulz | ................... | B62D 21/00 296/204 |
| 5,887,896 A * | 3/1999 | Kobayashi | ............... | B60G 7/02 280/781 |
| 6,286,867 B1 * | 9/2001 | Braemig | ................. | B60R 19/00 280/762 |
| 6,619,730 B2 * | 9/2003 | Porner | ................... | B62D 25/08 180/311 |

(Continued)

FOREIGN PATENT DOCUMENTS

| | | | | |
|---|---|---|---|---|
| DE | EP 1889742 A2 * | 2/2008 | .......... | B60K 15/067 |
| DE | 102011010059 A1 * | 8/2012 | .......... | B62D 25/087 |

(Continued)

OTHER PUBLICATIONS

Office Action dated Feb. 16, 2016, issued in counterpart Japanese Patent Application No. 2014-197434. (2 pages).

*Primary Examiner* — Drew Brown
(74) *Attorney, Agent, or Firm* — Westerman, Hattori, Daniels & Adrian, LLP (57) ABSTRACT

A rear sub-frame supporting a portion of left and right suspension devices on the rear side is connected to left and right rear side frames. A pair of left and right braces, the front end portions of which are joined to side sills and the rear end portions of which are joined to a middle area of the rear sub-frame in the vehicle width direction, are provided. Support recesses that swingably support control arms of the suspension devices are provided on the rear sub-frame. Intermediate areas of the left and right braces are each connected to a corresponding one of the left and right support recesses.

13 Claims, 6 Drawing Sheets

(56) References Cited

U.S. PATENT DOCUMENTS

| | | | | |
|---|---|---|---|---|
| 6,834,910 B2 * | 12/2004 | Wendland | ........... | B62D 21/152 296/187.01 |
| 7,090,290 B2 * | 8/2006 | Neumeier | ........... | B62D 21/00 280/793 |
| 7,475,754 B2 * | 1/2009 | Misaki | ........... | B62D 21/11 180/291 |
| 7,905,503 B2 * | 3/2011 | Goto | ........... | B62D 25/087 280/124.109 |
| 7,905,541 B2 * | 3/2011 | Yamaguchi | ........... | B62D 25/087 296/203.04 |
| 7,950,724 B2 * | 5/2011 | Yamaguchi | ........... | B60K 15/063 296/187.11 |
| 8,534,748 B1 * | 9/2013 | Aghssa | ........... | B62D 25/087 280/794 |
| 8,708,403 B2 * | 4/2014 | Herntier | ........... | B62D 25/08 280/781 |
| 8,998,305 B2 * | 4/2015 | Obata | ........... | B62D 21/11 296/193.08 |
| 9,156,504 B2 * | 10/2015 | Terada | ........... | B62D 25/087 |
| 9,296,293 B1 * | 3/2016 | Baccouche | ........... | B60K 15/07 |
| 2005/0110303 A1 * | 5/2005 | Neumeier | ........... | B62D 21/00 296/204 |
| 2009/0096253 A1 * | 4/2009 | Yatsuda | ........... | B62D 21/11 296/193.09 |

FOREIGN PATENT DOCUMENTS

| | | | | |
|---|---|---|---|---|
| DE | WO 2013178359 A1 * | 12/2013 | ........... | B62D 21/11 |
| DE | 102013101395 A1 * | 8/2014 | ........... | B62D 25/087 |
| DE | 102014206203 A1 * | 10/2015 | ........... | B62D 21/11 |
| DE | 102014207555 A1 * | 10/2015 | ........... | B62D 21/11 |
| FR | 3014072 A1 * | 6/2015 | ........... | B62D 25/2027 |
| JP | 11-078958 A | 3/1999 | | |
| JP | 2008-114652 A | 5/2008 | | |
| JP | WO 2013061514 A1 * | 5/2013 | ........... | B62D 25/025 |

* cited by examiner

FIG. 7

VEHICLE BODY REAR STRUCTURE

CROSS REFERENCES TO RELATED APPLICATIONS

The present application claims priority under 35 U.S.C. §119 to Japanese Patent Application No. 2014-197434, filed Sep. 26, 2014, entitled "Vehicle Body Rear Structure." The contents of this application are incorporated herein by reference in their entirety.

TECHNICAL FIELD

The present disclosure relates to a vehicle body rear structure that is provided with a rear sub-frame that supports portion of suspension devices provided at a rear portion of the vehicle body.

BACKGROUND

There is a rear structure of a vehicle body in which a rear sub-frame that supports portions of suspension devices on the rear side is attached to left and right rear side frames.

In the above type of a vehicle, since large loads are input to the rear sub-frame from the rear wheels through the suspension devices, there are cases in which the rear sub-frame is reinforced with a pair of left and right braces so as to allow the loads from the rear wheels to be received in a reliable manner (see Japanese Unexamined Patent Application Publication No. 2008-114652, for example).

In the vehicle body rear structure described in Japanese Unexamined Patent Application Publication No. 2008-114652, front end portion sides of the left and right braces are each joined to a corresponding one of rear end portions of left and right side sills (frame members disposed at lower sides of a vehicle compartment), and the rear end portion sides are joined to the middle area of a rear cross member. Furthermore, arm portions are provided so as to extend from the intermediate areas between the front end portions and the rear end portions of the braces, and distal ends of the arm portions are connected to the rear sub-frame (suspension members). In the case of the above vehicle body rear structure, since the left and right side sills and the rear cross member are connected obliquely with the braces, the support rigidity of the rear cross member is increased and, further, since the arm portions of the braces are connected to the rear sub-frame, the support rigidity of the rear sub-frame is increased as well.

SUMMARY

However, in the above-described conventional vehicle body rear structure, since portions of the rear sub-frame are joined to the arm portions of the braces, the support rigidity of the rear sub-frame increases; however, since the arm portions are joined at portions that are away from the supports of the suspension devices on the rear sub-frame, measures such as increasing the wall thicknesses of the members need to be taken in order to be able to receive a large input load from the suspension devices on the rear side in a stable manner.

Accordingly, the present disclosure describes a vehicle body rear structure that is capable of receiving a large load input from the suspension devices on the rear side in a stable manner while suppressing increase in the wall thicknesses of the members to the extent possible.

In order to overcome the above issue, the vehicle body rear structure according to the disclosure employs the following configuration. In the following explanation of the exemplary embodiment, specific elements with their reference numerals are indicated by using brackets. These specific elements are presented as mere examples in order to facilitate understanding, and thus, should not be interpreted as any limitation to the accompanying claims.

According to a first aspect of the disclosure, a vehicle body rear structure includes a pair of side sills (side sills 4 of the exemplary embodiments, for example) that extend substantially along left and right portions of a vehicle body and in a substantially front-rear direction of the vehicle body; a pair of rear side frames (rear side frames 6 of the exemplary embodiments, for example) that extend substantially along left and right portions of a vehicle body rear portion and in the substantially front-rear direction of the vehicle body; a rear sub-frame (a rear sub-frame 8 of the exemplary embodiments, for example), both ends of which in a vehicle width direction are connected to the rear side frames, the rear sub-frame supporting portions of left and right suspension devices (suspension devices 7 of the exemplary embodiments, for example) on a rear side; and a pair of braces (braces 10 of the exemplary embodiments, for example) in which front end portions are joined to the side sills and rear end portions are joined to a middle area of the rear sub-frame in the vehicle width direction. The rear sub-frame includes first arm supports (support recesses 17 of the exemplary embodiments, for example) that support first suspension arms (control arms 14 of the exemplary embodiments, for example) of the suspension devices in a swingable manner, and intermediate areas between the front end portions and the rear end portions of the left and right braces are each connected to a corresponding one of the left and right first arm supports.

With the above, portions between the rear sub-frame and the left and right side sills are reinforced with the braces such that horizontal deviation and torsion of the rear sub-frame are suppressed. Furthermore, since the intermediate area of each of the left and right braces is connected to the corresponding one of the left and right first arm supports, the rigidity of the first arm supports that directly receive the loads of the first suspension arms of the suspension devices can be increased in an efficient manner. Accordingly, the input loads from the rear wheels that are input to the rear sub-frame through the first suspension arms can be supported in a direct manner with the intermediate areas of the braces, and the support rigidity of the suspension devices on the rear side is increased.

According to a second aspect of the disclosure, connection brackets (connection brackets 19 of the exemplary embodiments, for example) that also serve to reinforce the braces are attached to the intermediate areas of the braces, the connection brackets include brace connections (brace connections 19a of the exemplary embodiments, for example) that are connected to the braces, and connection portions (connection portions 19b of the exemplary embodiments, for example) that extend from the brace connections towards the outer sides in the vehicle width direction and that are connected to first arm support sides, and the connection portions are formed so that outer edge surfaces are each formed so as to have a substantially arcuate curved shape and so that reinforcing beads (reinforcing beads 21 of the exemplary embodiments, for example) are provided at lateral edge portions of the outer edge surfaces so as to extend substantially along the curved shape.

With the above, the rigidity and strength of the connection portion of each connection bracket are increased with the reinforcing bead of the corresponding outer edge surface and, further, the rigidity and strength of the intermediate areas of the brace is increased with the connection brackets. As a result, the first arm supports of the rear sub-frame can be supported by the intermediate portions of the braces in a further rigid manner.

According to a third aspect of the disclosure, front edge portions of the rear side frames are disposed on inner sides of rear edge portions of the side sills in the vehicle width direction, second arm supports (holding brackets 24 of the exemplary embodiments, for example) that support second suspension arms (trailing arms 16 of the exemplary embodiments, for example) of the suspension devices in a swingable manner are provided on undersurfaces of the front edge portions of the rear side frames, reinforcement members (reinforcement members 25 of the exemplary embodiments, for example) are connected across lower portions of the second arm supports and the rear edge portions of the side sills, and the front end portions of the braces are joined to the rear edge portions of the side sills together with the reinforcement members.

With the above, the input loads from the rear wheel that are input through the second suspension arms are supported by the second arm support on the undersurfaces of the front edge portions of the rear side frames, and the input loads are further supported by the rear edge portions of the side sills through the reinforcement members. Furthermore, since the front end portions of the braces are joined to the rear edge portions of the side sills together with the reinforcement members, the support rigidity of the front end portions of the braces is increased in an efficient manner. Accordingly, with the above, the rigidity of the rear sub-frame can be increased with the braces in a further efficient manner.

According to a fourth aspect of the disclosure, the reinforcement members are each formed so as to have a substantially U-shaped cross section so that a closed section extending in the vehicle width direction is formed with the undersurface of the corresponding second arm support, side walls on both sides of the substantially U-shaped cross section are formed such that heights of the side walls increase from an inner side of the second arm support to an outer side of the second arm support in the vehicle width direction, and an edge portion of each reinforcement member on an outer side in the vehicle width direction is joined to an inner lateral side and an undersurface of the corresponding side sill.

With the above, the support rigidity of the second arm supports can be increased in an efficient manner with the closed sections that are formed between the reinforcement members and the undersurfaces of the second arm supports and that extend in the vehicle width direction. Furthermore, since the reinforcement members each have a shape in which the heights of the side walls increase from the inner side towards the outer side of the second arm support in the vehicle width direction, sufficient rigidity can be maintained while suppressing bulging of the reinforcement members to the surroundings to their minimum. Accordingly, the support rigidity of second arm supports and the front end portions of the braces can be sufficiently improved without greatly occupying the surrounding spaces and the rigidity of the suspension devices on the rear side can be increased in an efficient manner.

According to a fifth aspect of the disclosure, the rear edge portions of the braces are each provided with a rear portion fixing portion (a rear portion fixing portion 26 of the exemplary embodiments, for example) that is joined to an undersurface of the rear sub-frame and are each provided with a protective protrusion (a protective protrusion 27 of the exemplary embodiments, for example) that is provided on a rear side of the vehicle body with respect to the rear portion fixing portion and that bulges out lower than the rear portion fixing portion.

With the above, for example, when the vehicle is driven in reverse, even if an obstacle such as a protrusion on the ground or the like were to come into contact with the rear edge portion of the brace positioned on the undersurface side of the vehicle body, the protective protrusion positioned on the rear side of the vehicle body with respect to the rear portion fixing portion of the brace will come in contact first with the obstacle. As a result, the load from the obstacle is not easily input directly to the rear portion fixing portion of the brace and the joint strength between the brace and the rear sub-frame can be maintained at a high level.

According to a sixth aspect of the disclosure, the braces are each formed of a hollow pipe material, and either one of a front half area and a rear half area of each brace in a longitudinal direction is squashed such that sectional centers (sectional centers Cf and Cr of the exemplary embodiment, for example) of the front half area and the rear half area are offset with respect to each other.

With the above, when a load is input to the braces from the suspension devices and the like and, for example, when a load is input in the longitudinal direction of the braces, that is, when a load is input in the compressing direction of the braces, a moment bending each of the braces toward the biased sides of the sectional centers acts on the front half area and the rear half area of each of the braces. Accordingly, the front half area and the rear half area of each brace bends and deforms in opposing directions such that the entire brace in the longitudinal direction is prevented from being bent in the same direction. Accordingly, each brace in the longitudinal direction is not easily bent greatly in one direction and the support rigidity of the braces with respect to the rear sub-frame is increased.

According to the present disclosure, for example, since the intermediate area of each brace is connected to the corresponding one of the left and right first arm supports on the rear sub-frame, the intermediate area of each brace can efficiently reinforce the corresponding first arm support that directly receives the load from the first suspension arm of the corresponding suspension device on the rear side. Accordingly, large loads input from the suspension devices on the rear side can be received in a stable manner while suppressing increase in the wall thicknesses of the members. Accordingly, the present disclosure, for example, can increase the support rigidity of the suspension devices on the rear side while suppressing increase in the vehicle body weight.

BRIEF DESCRIPTION OF THE DRAWINGS

The advantages of the disclosure will become apparent in the following description taken in conjunction with the following drawings.

DETAILED DESCRIPTION OF THE PREFERRED EMBODIMENTS

Hereinafter, an exemplary embodiment of the disclosure will be described with reference to the drawings. Note that in the drawings, arrow FR indicates the forward direction of the vehicle, arrow UP indicates the upward direction of the vehicle, and arrow LH indicates the leftward direction of the vehicle.

Figure 1:
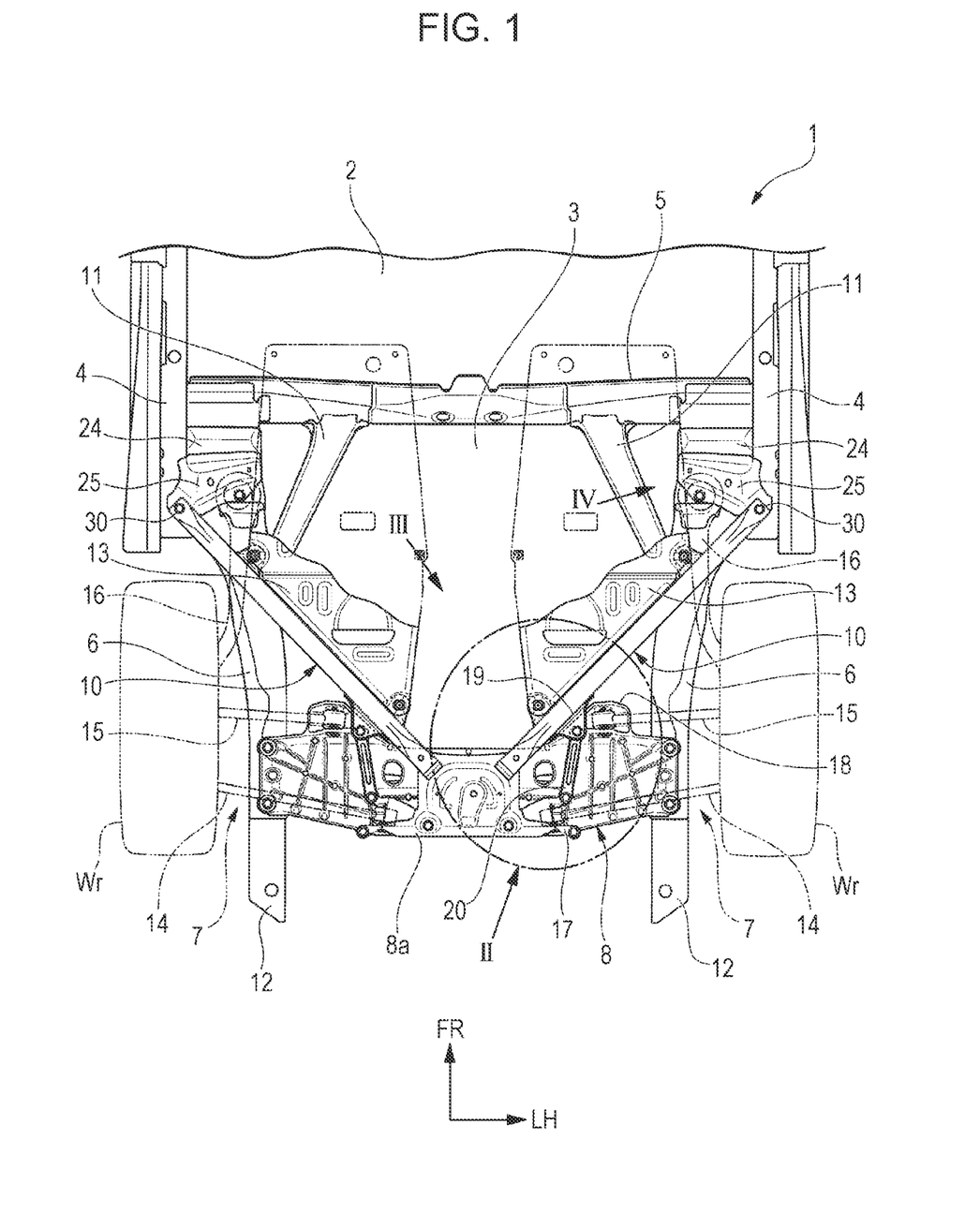
FIG. 1 is a diagram of a frame portion of a rear portion of a vehicle of an exemplary embodiment viewed from the lower side.

FIG. 1 is a diagram of a frame portion of the rear portion of a vehicle 1 according to the present exemplary embodiment viewed from below.

The vehicle 1 of the present exemplary embodiment is a rear-wheel-drive vehicle in which an engine (not shown) that is mounted on a rear portion of a vehicle body drives the rear wheels. An engine room 3 is disposed behind an occupant compartment 2 of the vehicle 1, and the occupant compartment 2 and the engine room 3 are partitioned by a rear partition wall (not shown). Side sills 4 that are frame members that extend in the front-rear direction of the vehicle body are disposed below the side portions on the left and right sides of the occupant compartment 2. A cross member 5 that extends in the vehicle width direction is disposed between the rear edge portions of the left and right side sills 4. The cross member 5 connects the left and right side sills 4 to each other. Furthermore, a pair of rear side frames 6 that extend from the cross member 5 towards the rear side of the vehicle body (extending in the front-rear direction of the vehicle body) are disposed on the inner sides of the rear edge portions of the left and right side sills 4 in the vehicle width direction. The front end portion of each of the left and right rear side frames 6 is joined to the cross member 5, and an outer side portion of the front edge portion of each of the left and right rear side frames 6 in the vehicle width direction is joined to the rear edge portion of the corresponding one of the left and right side sills 4.

Furthermore, two end portions of a rear sub-frame 8 which support portions of the left and right suspension devices 7 on the rear side are joined to the rear edge portions of the left and right rear side frames 6. The rear sub-frame 8 extends in the vehicle width direction and each of the two left and right end portions is fastened and fixed to an undersurface of the rear edge portion of the corresponding rear side frame 6. A fastening block 8a that bulges downwards is provided in the middle area of the undersurface of the rear sub-frame 8 in the vehicle width direction, and the fastening block 8a and the rear end portion of each of the left and right side sills 4 is connected by a brace 10. In the brace 10, which is an oblong pipe material in which the two edge portions are squashed flat edge portions, each of the squashed flat end portions are bolted and fastened to the undersurface of the fastening block 8a on the rear sub-frame 8 or to the undersurface of the rear edge portion of one of the side sills 4. Fastening of the braces 10 to the rear edge portions of the side sills 4 will be described in detail later.

Note that reference numerals 11 in FIG. 1 are reinforcing braces that are provided across each of the intermediate portions of the left and right rear side frames 6 and the cross member 5 and that reinforce the left and right rear side frames 6, and reference numerals 12 are load absorption members that absorb the rear collision load by being connected to the rear end portions of the left and right rear side frames 6. Furthermore, reference numerals 13 in FIG. 1 are undercovers that are attached to the left and right braces 10 and that cover the lower portion of the engine room 3.

Figure 2:
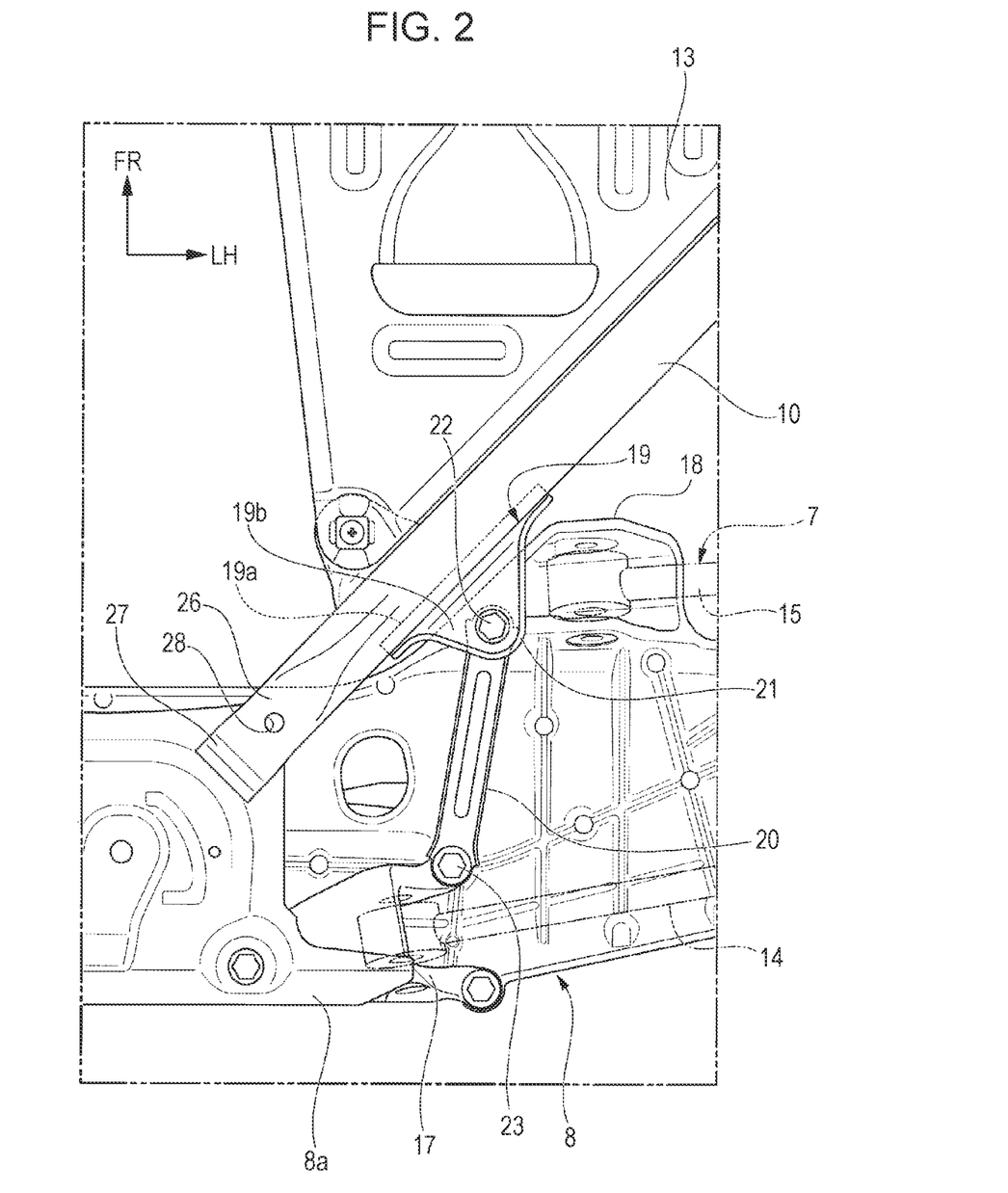
FIG. 2 is an enlarged view of portion II of the vehicle of the exemplary embodiment of the disclosure in FIG. 1.
Figure 3:
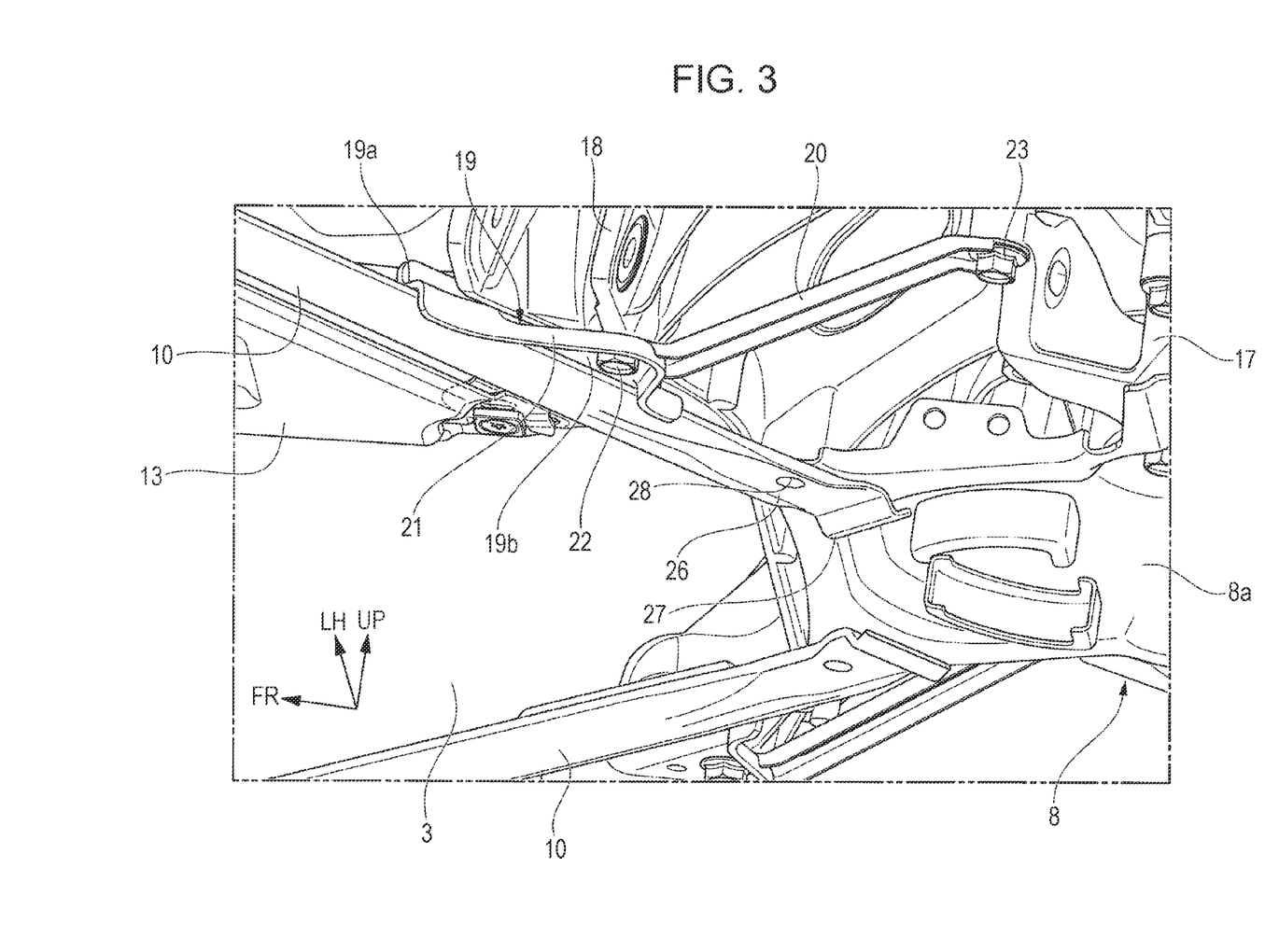
FIG. 3 is a perspective view of the vehicle of the exemplary embodiment of the disclosure taken in the direction of arrow III in FIG. 1.

FIG. 2 is a bottom view and FIG. 3 is a perspective view that illustrates the manner in which the brace 10 and the suspension device 7 on the left side are connected to the rear sub-frame 8. Note that hereinafter, while the description will be given mainly on the brace 10 and the suspension device 7 on the left side, the brace 10 and the suspension device 7 on the right side are connected in a manner similar to the left side.

Each of the suspension devices 7 on the rear side of the present exemplary embodiment is a so-called multilink suspension device in which a hub (not shown) of a rear wheel Wr is supported by a vehicle body frame through a plurality of arms. A control arm 14 (a first suspension arm) and a lower arm 15 (a third suspension arm) are provided so as to extend in a vertically swingable manner from a lower edge portion of the hub of the rear wheel Wr towards the inside in the vehicle width direction, and a trailing arm 16 (a second suspension arm) is provided so as to extend in a vertically swingable manner from the front edge portion of the hub of the rear wheel Wr towards the front side of the vehicle body. The suspension arms are supported by pivots. The lower arm 15 and the control arm 14 are disposed on the front portion side and the rear portion side, respectively, of the hub of the rear wheel Wr, and extend from the hub towards the front edge portion and the rear edge portion, respectively, of the rear sub-frame 8.

As illustrated in FIGS. 2 and 3, a support recess 17 (a first arm support) that has a substantially U-shaped cross section and that supports the extending end of the control arm 14 of the suspension device 7 in a vertically swingable manner and a support recess 18 (a third arm support) that has a substantially U-shaped cross section and that supports the extending end of the lower arm 15 of the suspension device 7 in a vertically slidable manner are provided on the undersurface of the rear sub-frame 8 at positions outside the fastening block 8a in the vehicle width direction. The support recess 17 that supports the control arm 14 is provided at a position close to the fastening block 8a and at the rear edge portion of the rear sub-frame 8, and the support recess 18 that supports the lower arm 15 is provided in the front edge portion of the rear sub-frame 8 and at a position on the outer side in the vehicle width direction with respect to the support recess 17.

Furthermore, connection brackets 19 that also serve to reinforce the braces 10 are each attached to an intermediate area between the front end portion and the rear end portion of each of the left and right braces 10, more accurately, a position in the intermediate area that is on the rear end portion side with respect to the middle position in the extending direction. Each connection bracket 19 of the present exemplary embodiment includes a brace connection 19a that is welded and fixed to the brace 10, and a connection portion 19b that extends from the brace connection 19a towards the outer side in the vehicle width direction and towards the rear side of the vehicle body and that is connected to the support recess 17 on the rear edge portion side of the rear sub-frame 8 through the connection rod 20.

The connection portion 19b is formed so that the outer edge surface in the extending direction has a substantially arcuate curved shape and so that the peripheral edge portion including the outer edge surface is bent so as to be substantially perpendicular to the extending wall such that a reinforcing bead 21 is formed. Furthermore, a bolt insertion hole (not shown) is provided in the extending wall of the connection portion 19b, and a bolt 22 is inserted into the bolt insertion hole to fasten and fix the connection bracket 19 and the connection rod 20 thereto.

The distal end of the connection rod 20 joined to the connection bracket 19 with the bolt 22 extends towards the rear side of the vehicle body and the extending end of the connection rod 20 is fastened and fixed to the opening edge portion of the support recess 17 on the rear edge portion side on the rear sub-frame 8 with a bolt 23. Accordingly, the intermediate area of the brace 10 between the front end portion and the rear end portion is connected to the support recess 17 on the rear edge side of the rear sub-frame 8 through the connection bracket 19 and the connection rod 20.

Furthermore, in the case of the present exemplary embodiment, the connection portion 19b of the connection bracket 19 is, as described above, joined to the connection rod 20 with the bolt 22. The connection portion 19b is also fastened and fixed to the opening edge portion of the support recess 18 on the front edge portion side of the rear sub-frame 8 with the same bolt 22. Accordingly, the intermediate area of the brace 10 is also connected to the support recess 18 of the rear sub-frame 8 through the connection bracket 19.

Figure 4:
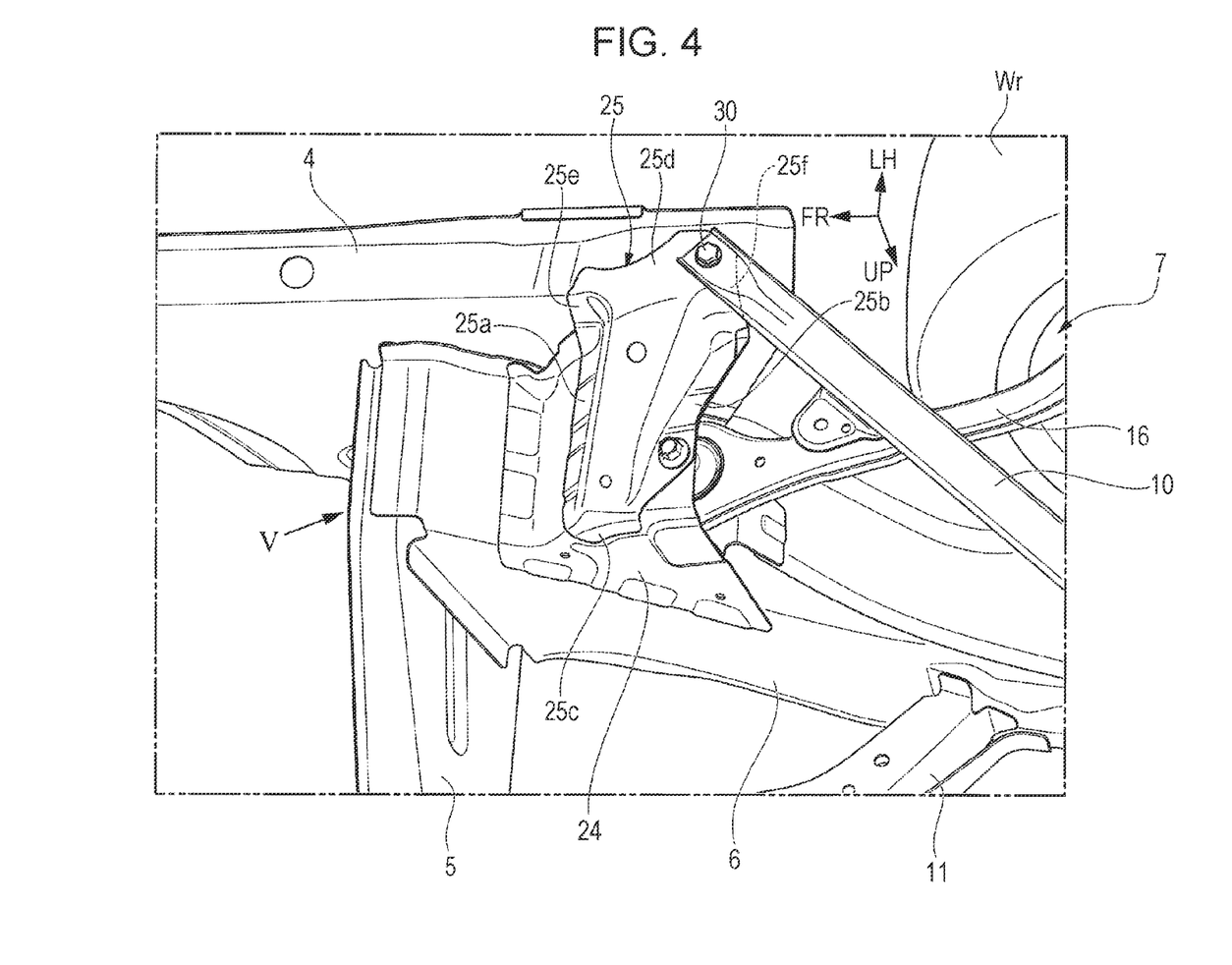
FIG. 4 is a perspective view of the vehicle of the exemplary embodiment of the disclosure taken in the direction of arrow IV in FIG. 1.
Figure 5:
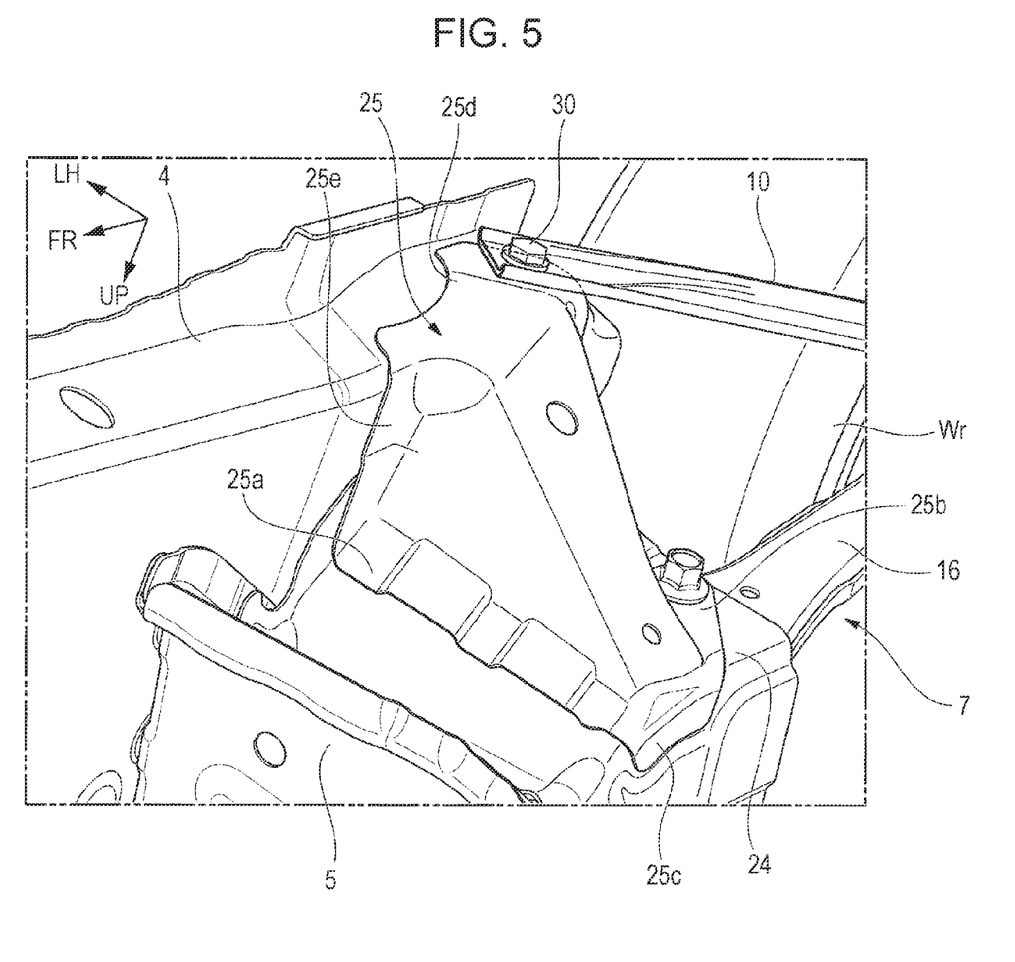
FIG. 5 is a perspective view of the vehicle of the exemplary embodiment of the disclosure taken in the direction of arrow V in FIG. 4.

FIGS. 4 and 5 are perspective views each illustrating a manner in which the front end portion of the brace 10 and the extending end of the trailing arm 16 are fastened to the vehicle body.

As illustrated in the drawings, a holding bracket 24 (a second arm support) that has a recessed shape that is open towards the rear side of the vehicle body is welded and fixed to the undersurface of the front edge portion of the rear side frame 6, and the extending end of the trailing arm 16 is supported by the holding bracket 24 in a swingable manner.

Note that while the rear edge portion of the side sill 4 is disposed adjacent to the outer side of the front edge portion of the rear side frame 6 in the vehicle width direction, the height of the undersurface of the rear edge portion of the side sill 4 is lower than the height of the undersurface of the holding bracket 24 that is provided under the rear side frame 6. A reinforcement member 25 formed of a metal plate is attached to an area extending across the lower area of the holding bracket 24 to the rear edge portion of the side sill 4.

The reinforcement member 25 is formed such that its section in the front-rear direction of the vehicle body has a substantially U-shape that open upwards. The reinforcement member 25 constitutes a rectangular closed section between the undersurface of the holding bracket 24. The closed section formed by the reinforcement member 25 and the holding bracket 24 extends substantially in the vehicle width direction substantially between the inner edge and the outer edge of the holding bracket 24 in the vehicle width direction. However, the heights of both side walls on the front and rear side of the section of the reinforcement member 25 having a substantially U-shape are not uniform in the vehicle width direction and are formed such that the heights increases from the inner side towards the outer side in the vehicle width direction. Accordingly, the reinforcement member 25 has a substantially right-angled triangle shape when viewed in the front-rear direction. Accordingly, the height of the closed section formed by the reinforcement member 25 and the holding bracket 24 also increases from the inner side towards the outer side in the vehicle width direction.

In the reinforcement member 25, joint flanges 25a, 25b, and 25c are formed at the front edge portion, at the rear edge portion, and at the edge portion on the inner side in the vehicle width direction, and are joined to the undersurface of the holding bracket 24 and the lateral side of the holding bracket 24 on the inner side in the vehicle width direction. Furthermore, a joint piece 25d that is joined to the undersurface of the corresponding one of the left and right side sills 4 is provided so as to extend in the outer edge of the reinforcement member 25 in the vehicle width direction, and joint flanges 25e and 25f are provided so as to extend on the inner lateral surface of the corresponding one of the left and right side sills 4 in the vehicle width direction. The front end portions of the left and right braces 10 described above are placed on the undersurfaces of the joint pieces 25d, which are joined to the undersurface of the side sills 4, at areas on the rear edge portion side, and the front end portions of the braces 10 are fastened and fixed to the undersurfaces of the side sills 4 together with the joint pieces 25d with bolts 30.

Incidentally, as illustrated in FIGS. 2 and 3, the rear edge portions of the left and right braces 10 are provided with rear portion fixing portions 26 that are bolted to the undersurface of the fastening block 8a of the rear sub-frame 8 and are provided with protective protrusions 27 that protrude on the rear side of the vehicle body with respect to the rear portion fixing portions 26 and lower than the rear portion fixing portions 26. Note that in the drawings, the bolts for fixing the rear portion fixing portions 26 to the fastening block 8a are not shown and reference numerals 28 in the drawings are bolt insertion holes provided in the rear portion fixing portions 26. Furthermore, the protective protrusions 27 are each formed by bending a portion of the brace 10 on the rear end side downwards in a partial arc shape.

According to the vehicle body rear structure of the present exemplary embodiment, basically, since portions between the middle area of the rear sub-frame 8 and the left and right side sills 4 are reinforced with the braces 10, the support rigidity of the rear sub-frame 8 can be increased with the braces 10. Accordingly, the vehicle body rear structure is capable of suppressing horizontal deviation and torsion of the rear sub-frame 8.

In particular, the vehicle body rear structure can efficiently increase the rigidity of the portions in the suspension devices 7 where the load of the control arms 14 are directly received since the intermediate areas between the front end portions and the rear end portions of the left and right braces 10 are connected to the support portions (the support recesses 17) of the control arms 14 on the rear sub-frame 8 through the connection brackets 19 and the connection rods 20. Accordingly, by employing the vehicle body rear structure, while suppressing increase in the wall thicknesses of the members, large loads that are input from the suspension devices 7 can be received in a stable manner by the vehicle body rear portion. Accordingly, while suppressing increase in the weight of the vehicle body, running stability can be further improved.

Furthermore, the vehicle body rear structure according to the exemplary embodiment can efficiently increase the rigidity of the intermediate areas of the braces 10 with the connection brackets 19 since the connection brackets 19 that also serve to reinforce the braces 10 are attached to the intermediate areas of the braces 10 and since the intermediate areas of the braces 10 are connected to the support recesses 17 on the rear sub-frame 8 through the connection brackets 19 and the connection rods 20. In particular, since the connection brackets 19 each include the brace connection 19*a* that is connected to the brace 10, and the connection portion 19*b* that extends from the brace connection 19*a* towards the outer side in the vehicle width direction and that is connected to the connection rod 20, and since the extending end of the connection portion 19*b* is formed so as to have a substantially arcuate curved shape and the reinforcing bead 21 is provided on the lateral edge portion of the outer edge surface of the connection portion 19*b*, the rigidity of the entire connection portion 19*b* is high. Accordingly, by employing the vehicle body rear structure, the support portions (the support recesses 17) of the control arms 14 on the rear sub-frame 8 can be supported by the intermediate portions of the braces 10 in a further rigid manner.

Furthermore, the vehicle body structure according to the present exemplary embodiment can efficiently increase the rigidity of the portions where the load of the lower arms 15 are directly received as well because the intermediate areas of the left and right braces 10 are connected to the support portions (the support recesses 17) of the control arms 14 on the rear sub-frame 8 through the connection brackets 19 and the connection rods 20 and also because the intermediate areas of the left and right braces 10 are also connected to the support portions (the support recesses 18) of the lower arms 15 on the rear sub-frame 8 through the connection bracket 19.

Furthermore, in the vehicle body rear structure according to the present exemplary embodiment, since the holding brackets 24 that support the trailing arms 16 of the suspension devices 7 are attached to the undersurfaces of the front edge portions of the left and right rear side frames 6 and since the reinforcement members 25 are connected across the undersurfaces of the holding brackets 24 and the rear edge portions of the side sills 4, the loads from the rear wheels Wr that are input through the trailing arms 16 can be supported by the rear side frames 6 and the side sills 4 through the holding brackets 24 in a stable manner. Moreover, in the case of the vehicle body rear structure, since the front end portions of the left and right braces 10 are joined to the rear edge portions of the side sills 4 together with the reinforcement members 25, the support rigidity of the front end portions of the braces 10 can be increased in an efficient manner. Accordingly, with the above, the rigidity of the rear sub-frame 8 can be increased with the braces 10 in a further efficient manner.

Furthermore, in the vehicle body rear structure, since the reinforcement members 25 constitute closed sections extending in the vehicle width direction with the undersurfaces of the holding brackets 24, the support rigidity of the holding brackets 24 can be increased in an efficient manner with the closed sections.

Furthermore, since the heights of the front and rear side walls of each reinforcement member 25 are formed so as to increase from the inner side to the outer side of the holding bracket 24 in the vehicle width direction, sufficient rigidity can be obtained while suppressing bulging of the reinforcement members 25 to the surroundings to their minimum.

Accordingly, with the above structure, the support rigidity of the front end portions of the braces 10 can be sufficiently improved without greatly occupying the surrounding spaces and the rigidity of the rear sub-frame 8 can be increased with the braces 10 in a further efficient manner.

Furthermore, in the vehicle body rear structure according to the present exemplary embodiment, since the rear edge portions of the left and right braces 10 are provided with the rear portion fixing portions 26 that are bolted to the undersurface of the rear sub-frame 8 and, further, are provided with protective protrusions 27 that bulge out from the rear side of the vehicle body with respect to the rear portion fixing portions 26 and below the rear portion fixing portions 26, when the vehicle is driven in reverse, even if an obstacle such as a protrusion on the ground or the like were to come into contact with the rear edge portion of the brace 10, the protective protrusion 27 of the rear side of the vehicle body will come into contact with the obstacle before the rear portion fixing portion 26 of the brace 10 such that load from the obstacle is not easily input in a direct manner to the rear portion fixing portion 26 of the brace 10. Accordingly, the vehicle body rear structure of the present exemplary embodiment can maintain the strength of the joint between the braces 10 and the rear sub-frame 8 at a high level.

Figure 6:
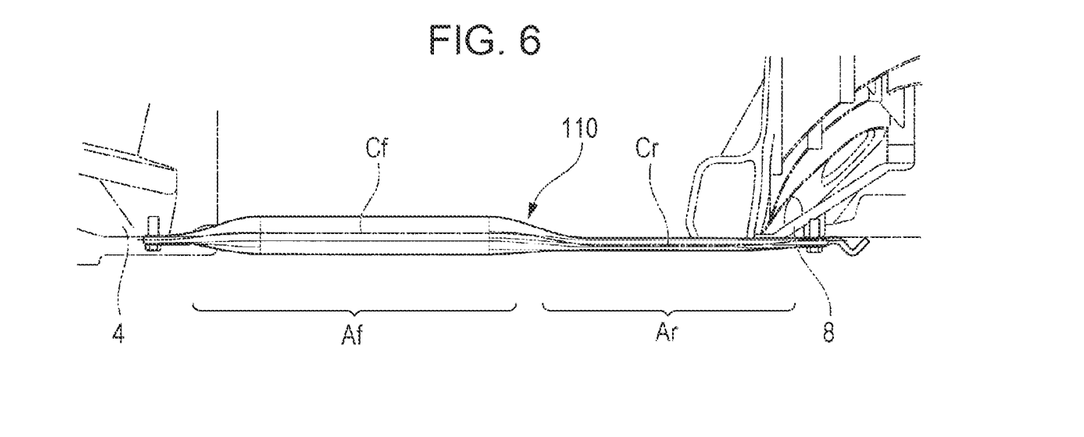
FIG. 6 is a side view of a brace of another exemplary embodiment of the disclosure.
Figure 7:
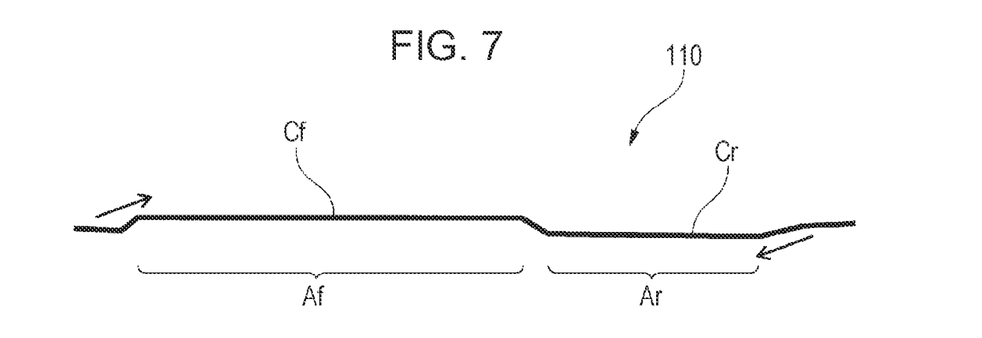
FIG. 7 is a side view illustrating the sectional center of the brace of the another exemplary embodiment of the disclosure.

FIGS. 6 and 7 are diagrams illustrating another exemplary embodiment. FIG. 6 is a diagram illustrating a lateral side of a brace 110 according to the another exemplary embodiment, and FIG. 7 is a diagram illustrating a central axis of a section of the brace 110 in FIG. 6. Note that the another exemplary embodiment is different from the exemplary embodiment described above only in that the structure of the brace 110 is different, and the other portions are the same in structure as those of the exemplary embodiment described above.

The brace 110 is formed of a hollow pipe material and both the front and rear edge portions are squashed flat. The squashed flat edge portions are each bolted to the undersurface of the side sill 4 and the undersurface of the rear sub-frame 8. In a front half area Af of the brace 110, only the portion on the front end side that is fastened to the side sill 4 is squashed flat in cross-sectional view. Conversely, in a rear half area Ar of the brace 110, not only the portion on the rear end side that is fastened to the rear sub-frame 8, but also the portion further in front thereof is also squashed flat in cross-sectional view. As illustrated in FIG. 7, in the brace 110 formed in the above manner, a sectional center Cf of the front half area Af and a sectional center Cr of the rear half area Ar are offset with respect each other in the vertical direction.

When a load is input from the suspension device in a longitudinal direction, that is, in a compressing direction of the brace 110 while, for example, the vehicle is traveling, as illustrated by the arrows in FIG. 7, a moment bending the brace 110 toward the biased sides of the sectional centers Cf and Cr act on each of the front half area Af and the rear half area Ar. With the above, the front half area Af and the rear half area Ar of the brace 110 attempt to bend and deform themselves in opposing directions and the bending and deformation of the front half area Af and the rear half area Ar are canceled out at substantially the middle area of the brace 110 in the longitudinal direction. Accordingly, when the brace 110 according to the present exemplary embodiment is employed, bending and deformation of the brace 110 becomes small and the support rigidity of the rear sub-frame 8 with the brace 110 becomes increased.

In the exemplary embodiment described herein, a portion that has an unsquashed section is provided in the front half area Af of the brace 110; however, in contrast to the above, an area with an unsquashed section may be provided in the rear half area of the brace 110.

Note that the disclosure is not limited to the exemplary embodiments described above and various design changes may be made without departing from the scope of the disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle body rear structure, comprising:
a pair of side sills provided at left and right sides of a vehicle body respectively and extending in a substantially front-rear direction of the vehicle body;
a pair of rear side frames provided at left and right sides of a vehicle body rear portion respectively and extending in the substantially front-rear direction of the vehicle body;
a rear sub-frame, both ends of which in a vehicle width direction are connected to the rear side frames respectively, and supporting a part of left and right rear suspension devices; and
left and right braces, each including a front end portion joined to a corresponding one of the side sills and rear end portion joined to a middle area of the rear sub-frame in the vehicle width direction, wherein
the rear sub-frame includes left and right first arm supports each supporting a first suspension arm of the respective suspension devices in a swingable manner, and
an intermediate area between the front end portion and the rear end portion of each of the left and right braces is connected to a corresponding one of the first arm supports.

2. The vehicle body rear structure according to claim 1, wherein
the intermediate area of the respective braces includes a connection bracket attached threreto and also serving to reinforce the respective braces,
the connection bracket includes a brace connection connected to the corresponding one of the braces, and a connection portion that extends from the brace connection towards an outer side in the vehicle width direction and that is connected to the first arm support, and
the connection portion is formed so that an outer edge thereof has a substantially arcuate curved shape, the connection portion having a reinforcing bead provided at the outer edge and extending substantially along the arcuate curved shape.

3. The vehicle body rear structure according to claim 2, wherein
the connection bracket is attached to the brace at a position located at a rear of a middle point between the front end portion and the rear end portion.

4. The vehicle body rear structure according to claim 2, wherein
the connection bracket is fixed to a third arm support disposed at a front portion of the rear sub-frame.

5. The vehicle body rear structure according to claim 1, wherein
front edge portions of the rear side frames are disposed on inner sides of rear edge portions of the side sills in the vehicle width direction respectively,
second arm supports that support second suspension arms of the suspension devices in a swingable manner respectively are provided on undersurfaces of the front edge portions of the rear side frames respectively,
reinforcement members are connected across lower portions of the second arm supports and the rear edge portions of the side sills respectively, and
the front end portions of the braces are joined to the rear edge portions of the side sills together with the reinforcement members respectively.

6. The vehicle body rear structure according to claim 5, wherein
the reinforcement members are each formed so as to have a substantially U-shaped cross section so that a closed section extending in the vehicle width direction is formed with the undersurface of a corresponding one of the second arm supports,
side walls on both sides of the substantially U-shaped cross section are formed such that heights of the side walls increase from an inner side of the second arm support to an outer side of the second arm support in the vehicle width direction, and
an edge portion of each of the reinforcement members on an outer side in the vehicle width direction is joined to an inner lateral side and an undersurface of a corresponding one of the side sills.

7. The vehicle body rear structure according to claim 6, wherein
the substantially U-shaped cross section is closed by the undersurface of the corresponding one of the second arm supports,
the side walls extend in the vehicle width direction.

8. The vehicle body rear structure according to claim 1, wherein
the rear end portions of the braces are each provided with a rear portion fixing portion joined to an undersurface of the rear sub-frame and are each provided with a protective protrusion that is provided at a rear of the rear portion fixing portion and that protrudes lower than the rear portion fixing portion.

9. The vehicle body rear structure according to claim 1, wherein
the braces are each formed of a hollow pipe material, and
either one of a front half area and a rear half area of each brace in a longitudinal direction is squashed such that a sectional center of the front half area and a sectional center of the rear half area are offset with respect to each other.

10. The vehicle body rear structure according to claim 9, wherein
the sectional center of the front half area and the sectional center of the rear half area are vertically offset with respect to each other.

11. The vehicle body rear structure according to claim 1, wherein ends of the respective first suspension arms are swingably connected to the respective first arm supports.

12. The vehicle body rear structure according to claim 1, wherein the respective first suspension arms are pivoted with respect to the respective first arm supports.

13. A vehicle comprising the vehicle body rear structure according to claim 1.

* * * * *